United States Patent
O'Connell et al.

(10) Patent No.: US 10,738,903 B2
(45) Date of Patent: Aug. 11, 2020

(54) MICROFLUIDIC RELIEF VALVE

(71) Applicant: International Business Machines Corporation, Armonk, NY (US)

(72) Inventors: Kevin O'Connell, Rochester, MN (US); Alex Matos, Rochester, MN (US); William J. Anderl, Rochester, MN (US); Karl Stathakis, Owatonna, MN (US)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 16/116,264

(22) Filed: Aug. 29, 2018

(65) Prior Publication Data
US 2020/0072372 A1 Mar. 5, 2020

(51) Int. Cl.
*F16K 17/00* (2006.01)
*F16K 99/00* (2006.01)

(52) U.S. Cl.
CPC ........ *F16K 17/003* (2013.01); *F16K 99/0036* (2013.01); *F16K 99/0019* (2013.01); *F16K 99/0034* (2013.01); *F16K 99/0061* (2013.01)

(58) Field of Classification Search
CPC .............. F16K 17/003; F16K 99/0061; F16K 99/0019; F16K 99/0032; F16K 99/0036; F16K 99/0034; B01L 3/502723; B01L 2300/0896; B01L 2300/14; B01L 2400/0677
See application file for complete search history.

(56) References Cited

U.S. PATENT DOCUMENTS

| 6,554,405 B1 | 4/2003 | Ohnishi et al. |
| 8,443,840 B2 | 5/2013 | Nemoto et al. |
| 8,505,572 B2 | 8/2013 | Krithivasan |

(Continued)

FOREIGN PATENT DOCUMENTS

WO    2010047648 A1    4/2010

OTHER PUBLICATIONS

Pandey et al., "Effect of Pressure on Fluid Damping in MEMS Torsional Resonators with Flow Ranging from Continuum to Molecular Regime", Springer, 2007 (see p. 92, col. 1, paras 1-2). https://link.springer.com/article/10.1007%2Fs11340-007-9076-2?LI=true.

(Continued)

*Primary Examiner* — Umashankar Venkatesan
(74) *Attorney, Agent, or Firm* — Patterson + Sheridan, LLP

(57) ABSTRACT

A microfluidic control apparatus, such as a relief valve, includes a pressure containing housing to contain a fluid within an interior of the pressure containing housing, and a nanotube in fluid communication between the interior of the pressure containing housing and an exterior of the pressure containing housing. The nanotube is used to contain water therein such that, below a predetermined temperature, the water within the nanotube prevents pressure relief through the nanotube from the interior to the exterior of the pressure containing housing, and above the predetermined temperature, the water within the nanotube enables pressure relief through the nanotube from the interior to the exterior of the pressure containing housing.

20 Claims, 4 Drawing Sheets

(56) References Cited

U.S. PATENT DOCUMENTS

| | | | | |
|---|---|---|---|---|
| 8,684,034 | B2* | 4/2014 | Gronland | F16K 99/0001 |
| | | | | 137/512.3 |
| 9,529,368 | B2 | 12/2016 | Jackie | |
| 2003/0019522 | A1* | 1/2003 | Parunak | B01L 3/502738 |
| | | | | 137/251.1 |
| 2004/0007275 | A1* | 1/2004 | Hui Liu | B01L 3/502738 |
| | | | | 137/828 |
| 2005/0217742 | A1* | 10/2005 | Bohm | G05D 7/0694 |
| | | | | 137/828 |
| 2005/0247356 | A1* | 11/2005 | Welle | B01L 3/502738 |
| | | | | 137/828 |
| 2005/0284511 | A1* | 12/2005 | Welle | B01L 3/502738 |
| | | | | 136/211 |
| 2006/0219308 | A1* | 10/2006 | Oh | F15C 5/00 |
| | | | | 137/827 |
| 2008/0031782 | A1* | 2/2008 | Beerling | B01L 3/502707 |
| | | | | 422/400 |
| 2015/0285794 | A1 | 10/2015 | Maerkl et al. | |

OTHER PUBLICATIONS

Chandler, David L. "Inside Tiny Tubes, water turns solid when it should be boiling—MIT Researchers discover astonishing behavior of water confined in carbon nanotubes", MIT News, Nov. 28, 2016, 3 pp.

* cited by examiner

MICROFLUIDIC RELIEF VALVE

TECHNICAL FIELD

The present disclosure relates to microfluidic control apparatus, and more specifically, to a pressure relief valve that incorporates the use of a nanotube for microfluidic control.

BACKGROUND

Microfluidics relates to the behavior, control, and manipulation of fluids that are geometrically constrained to a small, typically sub-millimeter, scale at which capillary penetration governs mass transport. Microfluidic devices to control fluid movement, which include micropumps and microvalves, can be constructed using various fabrication techniques and have various applications in the environmental, medical, biotechnical, printing, analytical instrumentation, and miniature cooling industries. Microvalves, however, cannot simply be constructed as scaled down versions of macrovalves of larger dimensions, as the components included within the microvalve are not practically or economically scalable. Accordingly, what is needed is a microfluidic control apparatus or device, in particular that may be used to control or relieve pressure within microfluidic fluid applications.

SUMMARY

According to one embodiment of the present disclosure, a microfluidic control apparatus includes a pressure containing housing to contain a fluid within an interior of the pressure containing housing, and a nanotube in fluid communication between the interior of the pressure containing housing and an exterior of the pressure containing housing. Water is positioned within the nanotube and configured to be in a solid state below a predetermined pressure or below a predetermined temperature, and in a liquid state above the predetermined pressure or above the predetermined temperature. When the water is in the solid state, the nanotube prevents fluid communication between the interior and the exterior of the pressure containing housing through the nanotube, and when the water is in the liquid state, the nanotube enables fluid communication between the interior and the exterior of the pressure containing housing through the nanotube.

According to another embodiment of the present disclosure, a microfluidic relief valve includes a pressure containing housing to contain a fluid within an interior of the pressure containing housing, and a nanotube in fluid communication between the interior of the pressure containing housing and an exterior of the pressure containing housing. The nanotube contains water therein such that, below a predetermined temperature, the water within the nanotube prevents pressure relief through the nanotube from the interior to the exterior of the pressure containing housing, and above the predetermined temperature, the water within the nanotube enables pressure relief through the nanotube from the interior to the exterior of the pressure containing housing.

According to yet another embodiment of the present disclosure, a method of microfluidically relieving pressure from a pressure containing housing includes increasing a temperature of water within a nanotube above a predetermined temperature, the nanotube in fluid communication with an interior of the pressure containing housing, and flowing the water through the nanotube when above the predetermined temperature, thereby relieving pressure from the pressure containing housing through the nanotube.

DETAILED DESCRIPTION

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In embodiments of the present disclosure, a microfluidic control apparatus, and more particularly a microfluidic relief valve, is used to relieve pressure from a pressure containing housing. The pressure containing housing includes a fluid contained within an interior of the pressure containing housing, and one or more nanotubes are in fluid communication between the interior of the pressure containing housing and an exterior of the pressure containing housing. Water is positioned within the nanotube to control fluid flow and pressure relief within the nanotube, and thus between the interior and the exterior of the pressure containing housing. The water is in a solid state below a predetermined pressure or below a predetermined temperature, and is in a liquid state above a predetermined pressure or above a predetermined temperature. When the water is in the solid state, the water prevents fluid communication through the nanotube, and thus prevents fluid flow or pressure relief within the nanotube. When the water is in the liquid state, the water flows within or through the nanotube, thereby enabling pressure relief or pressure change across the nanotube.

Figure 1:
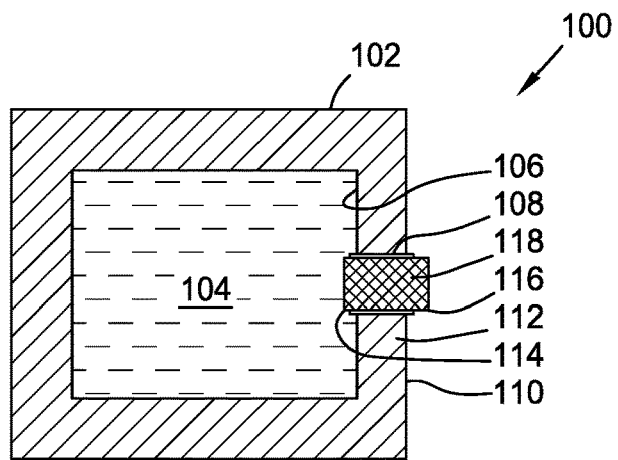
FIG. 1 is a cross-sectional schematic view of a microfluidic control apparatus before pressure is relieved from a pressure containing housing in accordance with one or more embodiments of the present disclosure.
Figure 2:
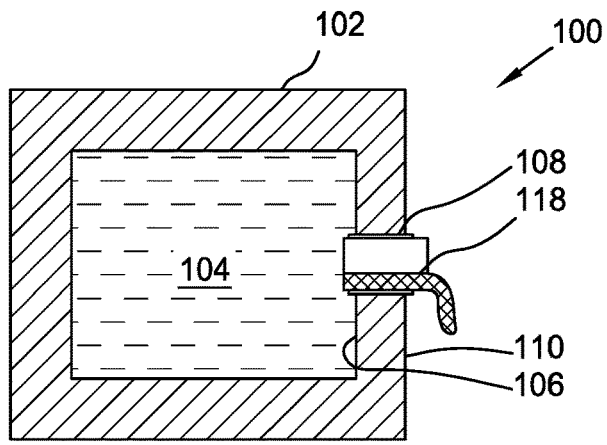
FIG. 2 is a cross-sectional schematic view of a microfluidic control apparatus after pressure is relieved from a pressure containing housing in accordance with one or more embodiments of the present disclosure.
Figure 3:
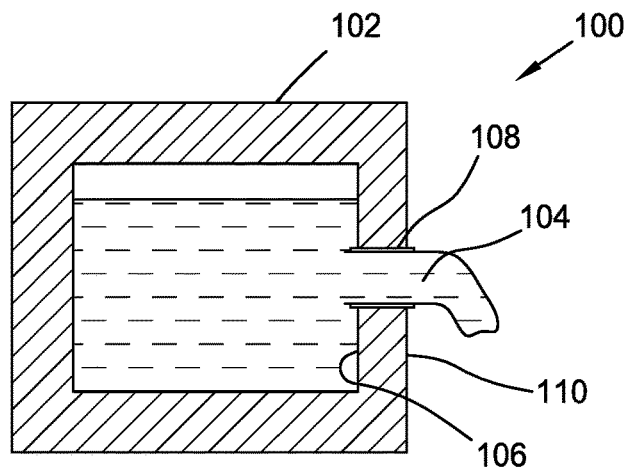
FIG. 3 is a cross-sectional schematic view of a microfluidic control apparatus after pressure is relieved from a pressure containing housing in accordance with one or more embodiments of the present disclosure.

FIGS. 1-3 are cross-sectional schematic views of a microfluidic control apparatus 100 in accordance with one or more embodiments of the present disclosure. The microfluidic control apparatus 100 may be used to control pressure, and more particularly relieve pressure, from a pressure containing housing 102. Accordingly, FIG. 1 is a view of the microfluidic control apparatus 100 before pressure is relieved from the pressure containing housing 102, and FIGS. 2 and 3 are views of the microfluidic control apparatus 100 while pressure is relieved from the pressure containing housing 102.

The microfluidic control apparatus 100 includes the pressure containing housing 102 with a fluid 104 contained or included within an interior 106 of the pressure containing housing 102. The pressure containing housing 102 is used to contain or enclose the fluid 104 under pressure such that, as the pressure of the fluid 104 increases or the pressure within the pressure containing housing 102 increases, the pressure containing housing 102 is capable of containing the fluid 104 under the pressure. As the pressure containing housing 102 may be used within a microfluidic application, the pressure containing housing 102 may have dimensions that are less than ten millimeters, and more particularly less than one millimeter or even micrometer.

The microfluidic control apparatus 100 includes one or more nanotubes 108 in fluid communication between the interior 106 of the pressure containing housing 102 and an exterior 110 of the pressure containing housing 102. When applicable, fluid 104 may flow through the nanotube 108 to relieve pressure, such as to relieve pressure from the pressure containing housing 102 or into the pressure containing housing 102. In FIGS. 1-3, the nanotube 108 is shown as in fluid communication between the interior 106 and the exterior 110 of the pressure containing housing 102 by being positioned within a wall 112 of the pressure containing housing 102. Thus, one end 114 of the nanotube 108 extends from the wall 112 and into the interior 106 of the pressure containing housing 102, and an opposite end 116 of the nanotube 108 extends from the wall 112 and exterior 110 of the pressure containing housing 102. In other examples, it is contemplated that that nanotube 108 may have ends which are flush with the surfaces of the pressure containing housing 102.

The nanotube 108 further includes or is filled with water 118. The water 118, due to unique properties at a nanoscale, may be in a solid state (e.g., solid phase), such as even at standard temperature and pressure ("STP"). For example, the International Union of Pure and Applied Chemistry has defined STP as a temperature of 0° C. (32° F.) and an absolute pressure of 105 Pa (100 kPa, 1 bar). When the water 118 is positioned within the nanotube 108 at STP, the water 118 will be in a solid state due to the properties of the water 118 when constrained within the nanotube 108. FIG. 1 shows the water 118 in a solid state and included within the nanotube 108. Further, in one or more embodiments, the water 118 may maintain the solid state in the nanotube 108, even at temperatures above the typical water boiling point (100° C. or 212° F.) and at one atmosphere of pressure. The size or internal diameter of the nanotube 108 may be used to determine or influence the state of the water 118 within the nanotube 108 at various temperatures and/or pressures.

When the water 118 is positioned in the nanotube 108 in the solid state, the water 118 may be used to prevent fluid communication through the nanotube 108. Thus, the water 118 may prevent fluid communication between the interior 106 and the exterior 110 of the pressure containing housing 102. As such, the water 118 in the solid state prevents pressure from being relieved through the nanotube 108 and from the fluid 104 from being able to flow through the nanotube 108. In such an example, the pressure containing housing 102 may form a closed volume for containing the fluid 104 therein, or a sealed channel for flowing the fluid 104 therethrough.

The water 118 may then transition to a liquid state (e.g., liquid phase), such as when above a predetermined temperature or above a predetermined pressure, or even to a gas state (e.g., gaseous phase). When the water 118 positioned in the nanotube 108 is in the liquid state, or even gas state, the water 118 may be used to enable fluid communication through the nanotube 108. For example, in the liquid state or gas state, the water 118 may be able to flow through the nanotube 108. If pressure has built up within the interior 106 of the pressure containing housing 102, the pressure will exert a force on the water 118 such that the water 118 within the nanotube 108 flows in a direction from the interior 106 to the exterior 110 of the pressure containing housing 102, and out of the nanotube 108. FIG. 2 shows an example of the water 118 positioned within the nanotube 108 in a liquid state with the water 118 flowing in the direction from the interior 106 to the exterior 110 of the pressure containing housing 102. In this embodiment, the water 118 is flowing out of the end 116 of the nanotube 108. In such an embodiment, the water 118 may flow out to the atmosphere, as shown, or may flow into another housing, such as a pressure containing housing. As the water 118 flows through and out of the nanotube 108, the interior of the nanotube 108 is no longer plugged by the solidified water 118, and the pressure within the interior 106 of the pressure containing housing 102 can be relieved through the nanotube 108.

After the water 118 has flowed out of the nanotube 108, the fluid 104 may then continue to flow out of the nanotube 108, relieving pressure within the pressure containing housing 102. For example, as shown in FIG. 3, if enough pressure is still contained within the pressure containing housing 102, the fluid 104 may follow the water 118 and flow out of the end 116 of the nanotube 108, driven by a pressure gradient t the nanotube 108. The fluid 104 may flow in the direction from the interior 106 to the exterior 110 of the pressure containing housing 102 until pressure is balanced across the nanotube 108 between the interior 106 to the exterior 110 of the pressure containing housing 102.

The water 118 may transition between the liquid state (or gas state) and the solid state when passing through a solidification point (e.g., freezing point). Generally, the solidification point for water at one atmosphere of pressure is about 0° C. (32° F.), or at STP discussed above. However, due to the unique properties of the water 118 at a nanoscale proportions within the nanotube 108, the solidification point may be affected and may be different than 0° C. (32° F.) at standard pressure (i.e., one atmosphere). It is contemplated that the solidification point at a particular pressure, such as at one atmosphere, may be adjusted by increasing or decreasing the inner diameter of the nanotube 108.

Figure 4:
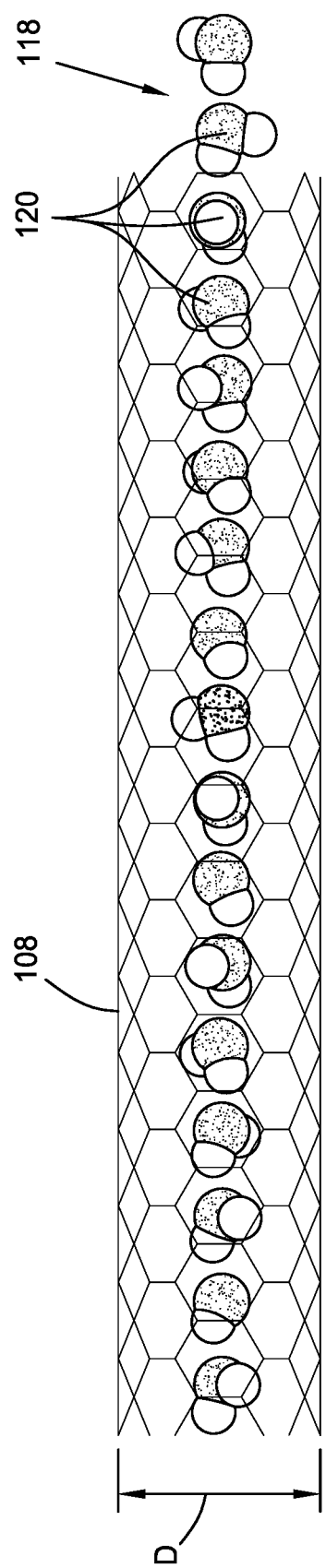
FIG. 4 is a detailed view of water in a nanotube in accordance with one or more embodiments of the present disclosure.

FIG. 4 is a detailed view of the water 118 in the nanotube 108 in accordance with one or more embodiments of the present disclosure. The nanotube 108, which may be a carbon nanotube as shown, has an inner diameter D. The inner diameter D may be used to define all, or just a portion, of the interior flow passage through the nanotube 108. Further, the water 118 is shown as individual molecules 120 positioned within the nanotube 108. In an embodiment in which the inner diameter D of the nanotube 108 is about 1.05 nanometers, the solidification point for the water 118 may be a temperature between about 105° C. and about 151° C. at one atmosphere of pressure. In another embodiment in which the inner diameter D of the nanotube 108 is about 1.06 nanometers, the solidification point for the water 118 may be a temperature between about 95° C. and about 140° C. at one atmosphere of pressure.

As the inner diameter D for the nanotube 108 decreases, the solidification point temperature for the water 118 increases. Thus, the temperature of the solidification point for the water 118 can be adjusted and predetermined based upon the size of the inner diameter D of the nanotube 108. Accordingly, by increasing the melting/solidification temperature above a predetermined temperature (and/or by increasing the melting/solidification pressure above a predetermined pressure), the water 118 may transition from the solid state to the liquid state, or even a gas. When transitioning the water 118 from the solid state, as shown in FIG. 1, to the liquid state in FIGS. 2 and 3, the water 118 may be used to relieve pressure from the interior 106 of the pressure containing housing 112.

The fluid 104 contained within the pressure containing housing 112 may include one or more different types (e.g., species) of fluids that may be in one or more different states. For example, the fluid 104 may include a gaseous fluid in a gas state and/or a liquid fluid in a liquid state. The state of the fluid 104 may also change, such as similar to that of the water 118. The fluid 104, or a species thereof, may have a solidification point that is the same or lower than the water 118. For example, the fluid 104 may also include water. The same or lower solidification point for the fluid 104 may enable the fluid 104 to be in a liquid state to flow into and through the nanotube 108 when the water 118 transitions from the solid state to the liquid state. Further, the fluid 104, or a species thereof, may have an effective molecular radius (i.e., molecular size) that is the same or lower than the water 118. The same or lower effective molecular radius for the fluid 104 may enable the fluid 104 to effectively fit into the nanotube 108, such as when flowing into and through the nanotube 108.

Figure 5:
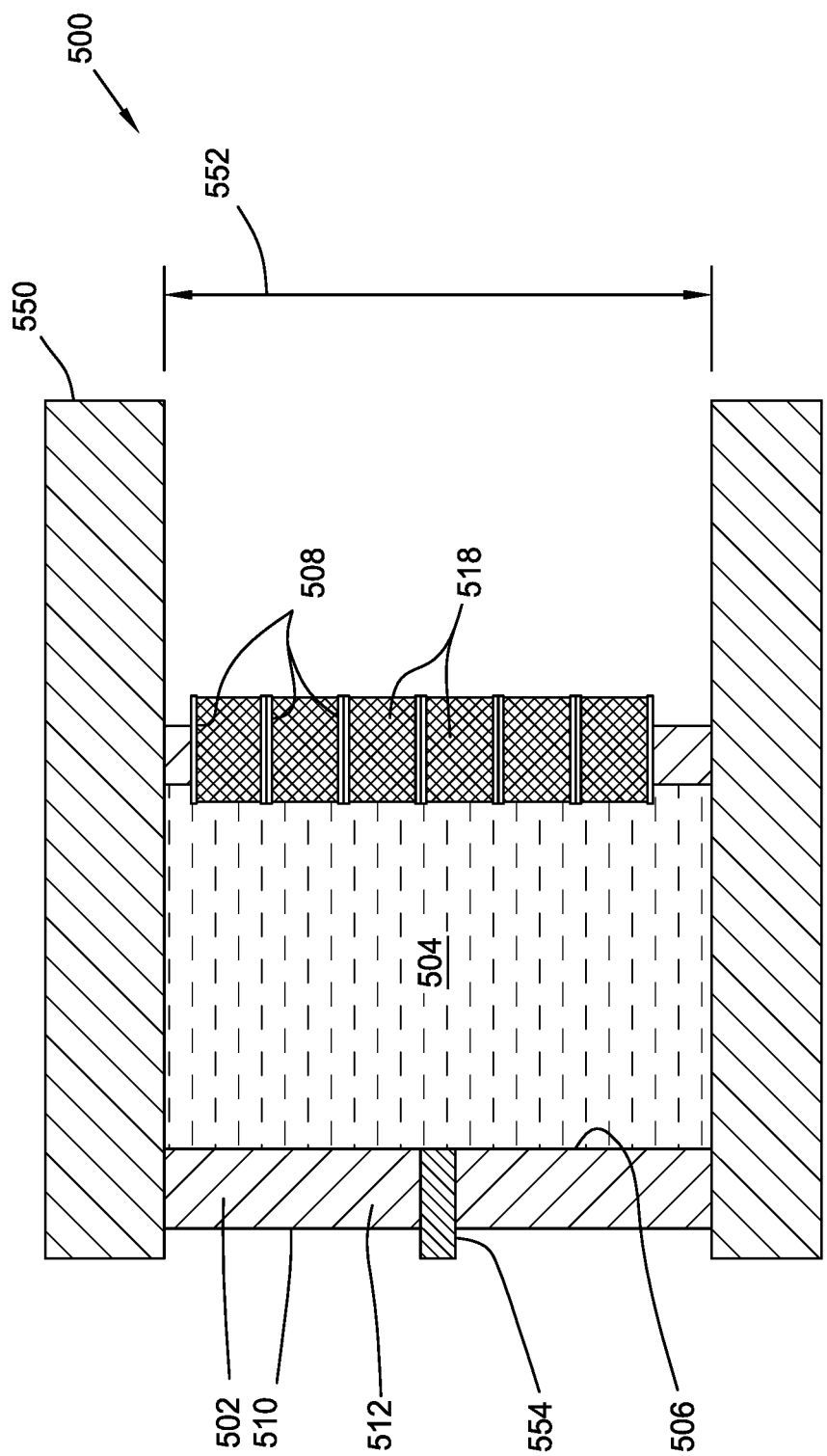
FIG. 5 is a cross-sectional schematic view of a microfluidic control apparatus before pressure is relieved from a pressure containing housing in accordance with one or more embodiments of the present disclosure.

A microfluidic control apparatus may be used for pressure relief at a microscopic scale in one or more various industries. For example, a microfluidic control apparatus may be used within the microcontroller, memory, and/or semiconductor industry. FIG. 5 is a cross-sectional schematic view of a microfluidic control apparatus 500 included within a microchip 550 in accordance with one or more embodiments of the present disclosure. The microfluidic control apparatus 500 is positioned within a channel 552 of the microchip 550 to control fluid flow and relieve pressure from a fluid 504 contained within a pressure containing housing 502.

The pressure containing housing 502 is positioned and formed against the microchip 550 within the channel 552. The pressure containing housing 502 includes a plurality of nanotubes 508 that are in fluid communication between an interior 506 and an exterior 510 of the pressure containing housing 502. The nanotubes 508 are used to relieve pressure from the interior 506 of the pressure containing housing 502. The nanotubes 508 may be stacked, such as shown in linear alignment with each other, or may be clustered, such as in a circular or honeycomb type pattern. The nanotubes 508 may each have about the same inner diameter with water 518 positioned within each of the nanotubes 508. Further, the water 518 is shown as in the solid state within the nanotubes 508.

The microfluidic control apparatus 500 may further include a one-way inlet 554 in fluid communication between the interior 506 and the exterior 510 of the pressure containing housing 502. For example, the one-way inlet 554 is shown as positioned within a wall 512 of the pressure containing housing 502. The one-way inlet 554 may be used to enable fluid flow from the exterior 510 to the interior 506 of the pressure containing housing 502. As such, the fluid 504 (or pressure) may be introduced into the interior 506 of the pressure containing housing 502 through the one-way inlet 554 to provide fluid or pressure source for the interior 506 of the pressure containing housing 502.

Figure 6:
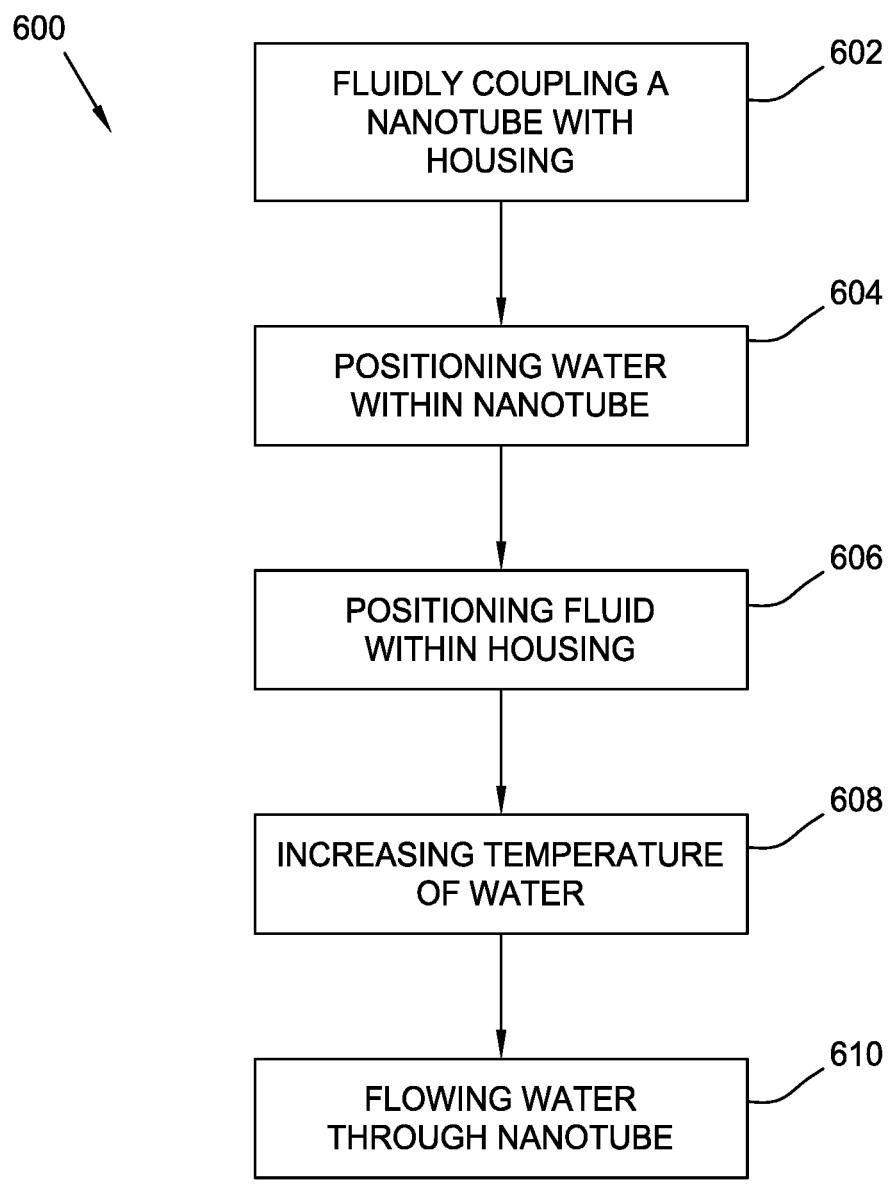
FIG. 6 is flowchart of a method of microfluidically relieving pressure from a pressure containing housing in accordance with one or more embodiments of the present disclosure.

Referring now to FIG. 6, a method 600 of microfluidically relieving pressure from a pressure containing housing in accordance with one or more embodiments of the present disclosure is shown. The method 600 includes fluidly coupling a nanotube between an interior and an exterior of the pressure containing housing in operation 602. The fluid coupling of the nanotube enables fluid communication through the nanotube between interior and the exterior of the pressure containing housing. The method 600 further includes positioning water within the nanotube in operation 604 and positioning a fluid within the interior of the pressure containing housing in operation 606. The operations 602-606 may be performed in any order with respect to each other. The method 600 proceeds to increasing a temperature of the water within the nanotube above a predetermined temperature in operation 608, such as above a solidification point for the water in the nanotube to transition to a liquid state. Additionally or alternatively, the method 600 may include increasing a pressure of the water within the nanotube above a predetermined pressure, such as above a solidification point for the water in the nanotube to transition to a liquid state. The method 600 then proceeds to flowing the water within or through the nanotube in operation 610. With the water flowing through the nanotube in operation 610, pressure is relieved from the interior to the exterior of the pressure containing housing through the nanotube. Operation 610 may also result in the fluid containing within the interior of the pressure containing housing flowing in the direction from the interior to the exterior of the pressure containing housing.

The use of directional terms such as above, below, upper, lower, upward, downward, left, right, and the like are used in relation to the illustrative embodiments as depicted in the figures, the upward direction being toward the top of the corresponding figure and the downward direction being toward the bottom of the corresponding figure. Further, as used herein, the term "about" encompasses +/−5% of each numerical value. For example, if the numerical value is "about 80%," then it can be 80% +/−5%, equivalent to 76% to 84%. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While the foregoing is directed to embodiments of the present invention, other and further embodiments of the invention may be devised without departing from the basic scope thereof, and the scope thereof is determined by the claims that follow.

What is claimed is:

1. A microfluidic control apparatus, comprising:
   a pressure containing housing configured to contain a fluid within an interior of the pressure containing housing;
   a nanotube in fluid communication between the interior of the pressure containing housing and an exterior of the pressure containing housing; and
   water positioned within the nanotube and configured to be in a solid state below a predetermined pressure or below a predetermined temperature, and in a liquid state above the predetermined pressure or above the predetermined temperature;
   wherein, when the water is in the solid state, the nanotube is configured to prevent fluid communication between the interior and the exterior of the pressure containing housing through the nanotube, and when the water is in the liquid state, the nanotube is configured to enable fluid communication between the interior and the exterior of the pressure containing housing through the nanotube.

2. The apparatus of claim 1, wherein the nanotube comprises an inner diameter of about 1.05 nanometers and the predetermined temperature is between about 105° C. and about 151° C.

3. The apparatus of claim 1, wherein the nanotube comprises an inner diameter of about 1.06 nanometers and the predetermined temperature is between about 95° C. and about 104° C.

4. The apparatus of claim 1, wherein the fluid contained within the interior of the pressure containing housing comprises a gaseous fluid or a liquid fluid.

5. The apparatus of claim 1, wherein the fluid contained within the pressure containing housing that has an effective molecular radius that is the same or smaller than water.

6. The apparatus of claim 1, wherein the fluid contained within the pressure containing housing comprises a solidification point that is the same or lower than water.

7. The apparatus of claim 1, wherein the fluid contained within the pressure containing housing comprises water.

8. The apparatus of claim 1, wherein the pressure containing housing comprises an enclosure, and wherein the nanotube is positioned within a wall of the pressure containing housing.

9. The apparatus of claim 1, further comprising a one-way inlet in fluid communication between the interior and the exterior of the pressure containing housing and configured to enable fluid flow from the exterior to the interior of the pressure containing housing and to prevent fluid flow from the interior to the exterior of the pressure containing housing.

10. The apparatus of claim 1, further comprising a microchip with the pressure containing housing formed against the microchip.

11. The apparatus of claim 1, wherein the nanotube comprises a plurality of nanotubes with water positioned within each of the nanotubes.

12. The apparatus of claim 1, wherein the nanotube comprises a carbon nanotube.

13. A microfluidic relief valve, comprising:
    a pressure containing housing configured to contain a fluid within an interior of the pressure containing housing; and
    a nanotube in fluid communication between the interior of the pressure containing housing and an exterior of the pressure containing housing, the nanotube configured to contain water therein such that, below a predetermined temperature, the water within the nanotube prevents pressure relief through the nanotube from the interior to the exterior of the pressure containing housing, and above the predetermined temperature, the water within the nanotube enables pressure relief through the nanotube from the interior to the exterior of the pressure containing housing.

14. The valve of claim 13, wherein, below the predetermined temperature, the water is in a solid state within the nanotube to prevent pressure relief, and above the predetermined temperature, the water is in a liquid state within the nanotube to enable pressure relief.

15. The valve of claim 13, wherein the nanotube comprises an inner diameter of about 1.05 nanometers and the predetermined temperature is between about 105° C. and about 151° C.

16. The valve of claim 13, wherein the nanotube comprises an inner diameter of about 1.06 nanometers and the predetermined temperature is between about 95° C. and about 141° C.

17. A method of microfluidically relieving pressure from a pressure containing housing, comprising:
    increasing a temperature of water within a nanotube above a predetermined temperature, the nanotube in fluid communication with an interior of the pressure containing housing; and
    flowing the water through the nanotube when above the predetermined temperature, thereby relieving pressure from the pressure containing housing through the nanotube.

18. The method of claim 17, further comprising:
    positioning the water within the nanotube; and
    fluidly coupling the nanotube between the interior and an exterior of a pressure containing housing.

19. The method of claim 17, further comprising positioning a fluid within the interior of the pressure containing housing, and wherein the relieving pressure from the pressure containing housing comprises flowing the fluid in a direction from the interior to the exterior of the pressure containing housing.

20. The method of claim 17, wherein the nanotube comprises an inner diameter of about 1.05 nanometers and the predetermined temperature is between about 105° C. and about 151° C.

* * * * *